United States Patent [19]
Salow

[11] Patent Number: 5,941,515
[45] Date of Patent: Aug. 24, 1999

[54] UNIVERSAL CONNECTING ROD FIXTURE AND METHOD

[75] Inventor: Robert Frederick Salow, Northville, Mich.

[73] Assignee: General Motors Corporation, Detroit, Mich.

[21] Appl. No.: 09/013,164

[22] Filed: Jan. 26, 1998

[51] Int. Cl.[6] ...................................................... B25B 5/16
[52] U.S. Cl. ........................ 269/265; 269/902; 269/305; 269/156; 29/281.5; 29/281.1
[58] Field of Search .............................. 269/265, 56, 909, 269/902, 156, 47, 52, 305, 303, 43, 315; 29/281.1, 281.5

[56] References Cited

U.S. PATENT DOCUMENTS

| | | | |
|---|---|---|---|
| 3,122,866 | 3/1964 | Gross | 269/52 |
| 4,541,620 | 9/1985 | Rottler et al. | 269/902 |
| 4,824,086 | 4/1989 | Rickling et al. | 269/909 |
| 5,255,901 | 10/1993 | Rottler | 269/305 |
| 5,556,085 | 9/1996 | Cyr | 269/909 |
| 5,640,750 | 6/1997 | Yoshida et al. | 29/281.5 |

*Primary Examiner*—David A. Scherbel
*Assistant Examiner*—Lee Wilson
*Attorney, Agent, or Firm*—Karl F. Barr, Jr.

[57] ABSTRACT

A universal locating fixture for machining various sizes of engine connecting rods. In one embodiment, the fixture includes locating pads, opposed clamps and a crank bore-engaging equalizing locator on a fixed part of the fixture for locating and clamping the crank end of a connecting rod forging for machining. A single locating pad and opposed clamp and a pin end-engaging V locator are mounted on an axially adjustable slide of the fixture for locating and clamping the pin end of a connecting rod for machining. The clamps may be made to accommodate differing widths of connecting rods and the equalizing locator has two locating points spaced to accommodate various crank bore diameters without adjustment. Adjustment of the fixture to machine connecting rods of different lengths requires only axial adjustment of the slide to position the pin end locating pad, clamp and V locator in proper position for the new length. The method requires that the various sizes of connecting rods all have commonly spaced locating and clamping points at the crank end and commonly positioned locating and clamping points at the pin end to allow machining of any length rod within the limits of travel of the slide.

5 Claims, 2 Drawing Sheets

UNIVERSAL CONNECTING ROD FIXTURE AND METHOD

TECHNICAL FIELD

This invention relates to the manufacture of connecting rods and in particular to a universal connecting rod locating fixture and method for positioning and clamping connecting rods for machining.

BACKGROUND OF THE INVENTION

Historically, connecting rods have been machined on transfer lines using fixtures to hold the parts while machining. The fixtures have used a 3-2-1 locating and clamping method. This employs three point locating on the thrust face or side of the connecting rod with opposed clamps, two locating points on the pin end and one side locator on the crank end.

A prior connecting rod transfer line has numerous fixtures required for all the drilling, reaming, boring and other operations. A problem with this fixture arrangement is that it is inflexible. When a change in engine design is made, it is common to change the crank bore diameter or the length of the connecting rod. In the past, this would involve a very costly change to a connecting rod line since new fixtures and other details would have to be changed to accommodate the new design. This could include, on the fixtures alone, new side locators and clamps and new crank bore locators and clamps for bore changes and new pin locators and clamps for length changes.

To reduce the cost and time delay of the conversion process, connecting rod lines are now in use with a two point crank bore equalizer to eliminate the need for a crank bore side locator which is dependent on the crank bore diameter. Also, some lines are being built that have a two or three position pin bore V-block on a turret. This will allow for machining two or three different known lengths of connecting rods on the same fixture.

SUMMARY OF THE INVENTION

The present invention involves a universal connecting rod fixture and method which improves upon the prior and current practice by providing for the manufacture in one fixture of any length connecting rod between the limits built into the fixture and variations in crank bore and rod thickness which are accommodated by the fixture. The method involves designing the connecting rods to have common locations for two crank bore side locators and their associated clamps as well as a two point equalizing crank bore locator. These locators remain in a fixed positions. A single side locator for the pin end and a V-locator for centering the pin end are placed together on a common moving slide so that the length of a connecting rod to be machined may be varied by the fixture in one simple adjustment of the slide. This can be by means of a push button control using a servo driven slide. Variations in crank bore diameter and thickness of the rods are also accommodated by the fixture.

These and other features and advantages of the invention will be more fully understood from the following description of a specific embodiment of the invention taken together with the accompanying drawings.

DESCRIPTION OF THE PREFERRED EMBODIMENT

Figure 1:
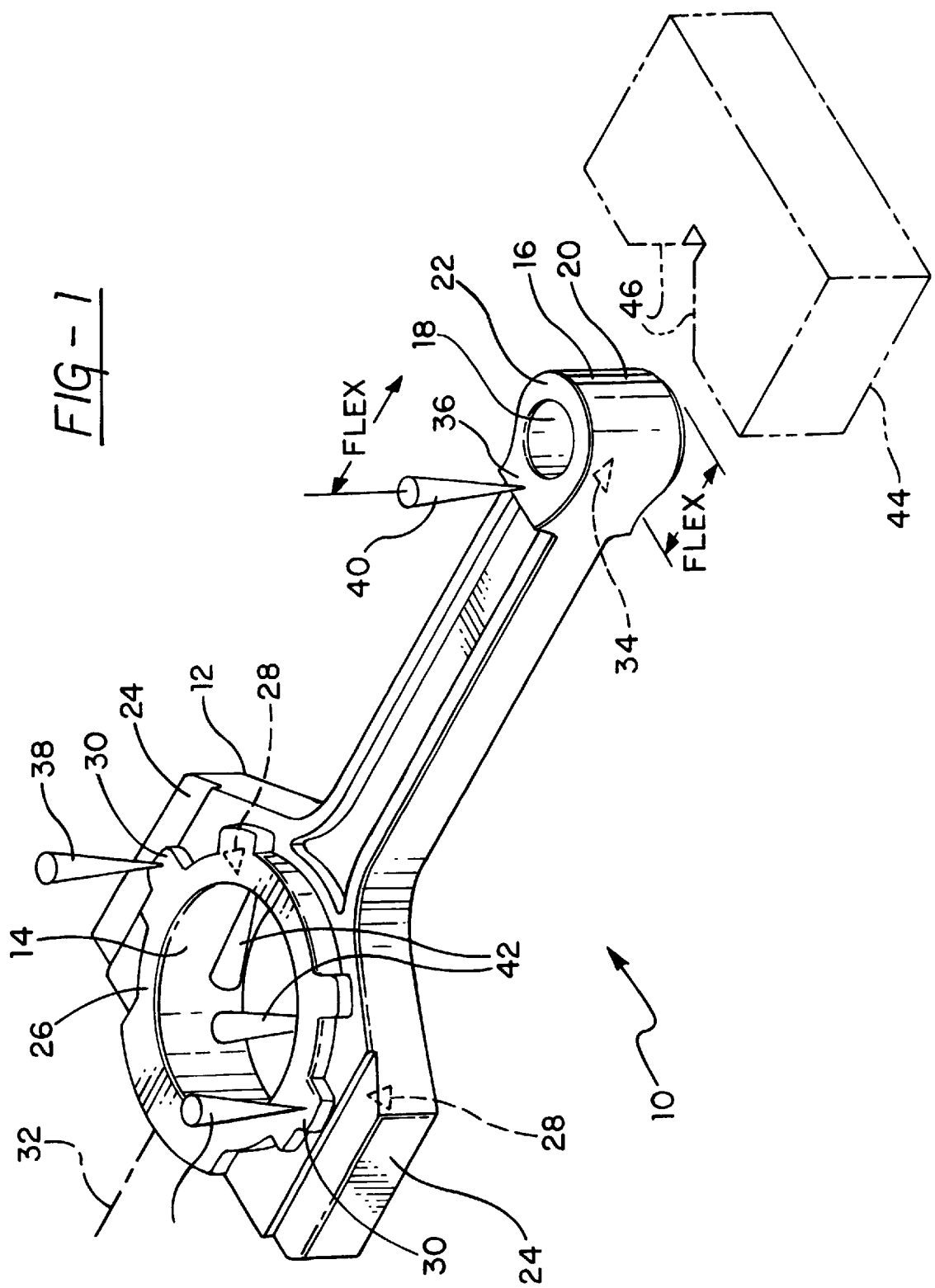
FIG. 1 is a pictorial view of a connecting rod with locations of indicators and clamps shown, illustrating the method of the invention.

Referring first to FIG. 1 of the drawings in detail, numeral 10 generally indicates an unfinished engine connecting rod exemplary of connecting rods capable of being machined in a fixture according to the method of the present invention. Connecting rod 10 is preferably formed by powder metal forging to provide a forging of high quality with a shape fairly close to its final dimensional form. As finally machined, the connecting rod has a large end or crank end 12 having a crank bore 14 formed therein. At its opposite small end or pin end 16, the connecting rod includes a pin bore 18 for receiving a wrist pin. The pin end has an outer surface 20 surrounding the pin bore. Sides 22 of the connecting rod at opposite ends of the pin bore are finish ground. The crank end 12 includes bolt flanges 24 on either side of the crank bore 14 and ground thrust faces or sides 26 surrounding the crank bore at both ends thereof.

The sides 26 include common features which are identical for all sizes of connecting rods to be located and machined in accordance with the invention. These include bosses for a pair of locating points 28 disposed a fixed distance apart on the back side of the connecting rod 10 as illustrated. On the near side 26, clamping points 30 are positioned on bosses directly opposite to the locating points 28 on the back side. The interior of the crank bore 14 prior to machining also provides a surface on which two established but unmarked locating points exist equally spaced on opposite sides of a longitudinal axis 32 of the connecting rod. These are contacted by a locator to be subsequently described.

At the pin end of the connecting rod, the sides 22 each include an area along the axis toward the crank bore which provides, on the bottom side, a locating point 34 and, on the top side, a clamping point 36. In FIG. 1, clamps 38, 40 are shown engaging the clamping points 30, 36, respectively, while locators 42 are schematically shown engaging the locating points, not shown, inside the bore. The locating points 28, 34 are shown by small triangles indicated in dashed lines, as they are hidden from view in the drawing. An additional V locator 44 is shown in phantom adjacent the pin end of the connecting rod with dashed lines indicating its position when engaging the outer surface 20 of the pin end with the angled V-shaped walls 46 of the V locator.

The steps of finishing a connecting rod from the forged blank 10 shown in FIG. 1 include:

1. Machining connecting rod and cap bolt holes, which may be done in a fixture according to the invention.
2. Separating the cap, or lower half, of the connecting rod large end from the remainder of the connecting rod large end by known fracture means, or other suitable means, outside of the locating fixture.
3. Finish grinding the sides of the connecting rod in a suitable grinding machine.
4. Mounting the connecting rod, with the cap reattached, in a locating fixture according to the invention and finish boring the crank and pin bores.
5. Removing the assembled and machined connecting rod from the locating fixture and micro-size honing the crank and pin bores to size.

In order to provide for handling connecting rods of various sizes, the clamping and locating positions on the large end of the connecting rods are the same for all connecting rods and the clamping and locating positions on the small ends of the connecting rods are also the same. However, the small end clamping and locating positions are moveable along the axis of the connecting rod relative to the large end of the connecting rod, where the clamping and locating positions are fixed. Thus, the position of a connecting rod 10 is fixed in a suitable fixture by placing the outside of the small end 16 against the angled walls 46, of the V locator and locating the large end of the connecting rod along the axis 32 by engaging the bore 14 with the locators 42. The rod is also positioned so that the locating points 28, 34 engage pads on the fixture and are held in these positions by the clamps 38, 40. After clamping, the locators 42, which are preferably formed on a common head, are retracted for machining of the crank bore. Clamps 38 are made movable along their axes (laterally of the connecting rod axes) to provide for clamping connecting rods of varied thickness, while the two point locators 42 inherently accommodate crank bores of various sizes within a limited range. To accommodate connecting rods of various lengths, the V locator 44 and the associated locating point 34 and clamp 40 are mounted on a moveable slide and so move together to predetermined positions associated with the specific connecting rod lengths which it is desired to machine.

Figure 2:
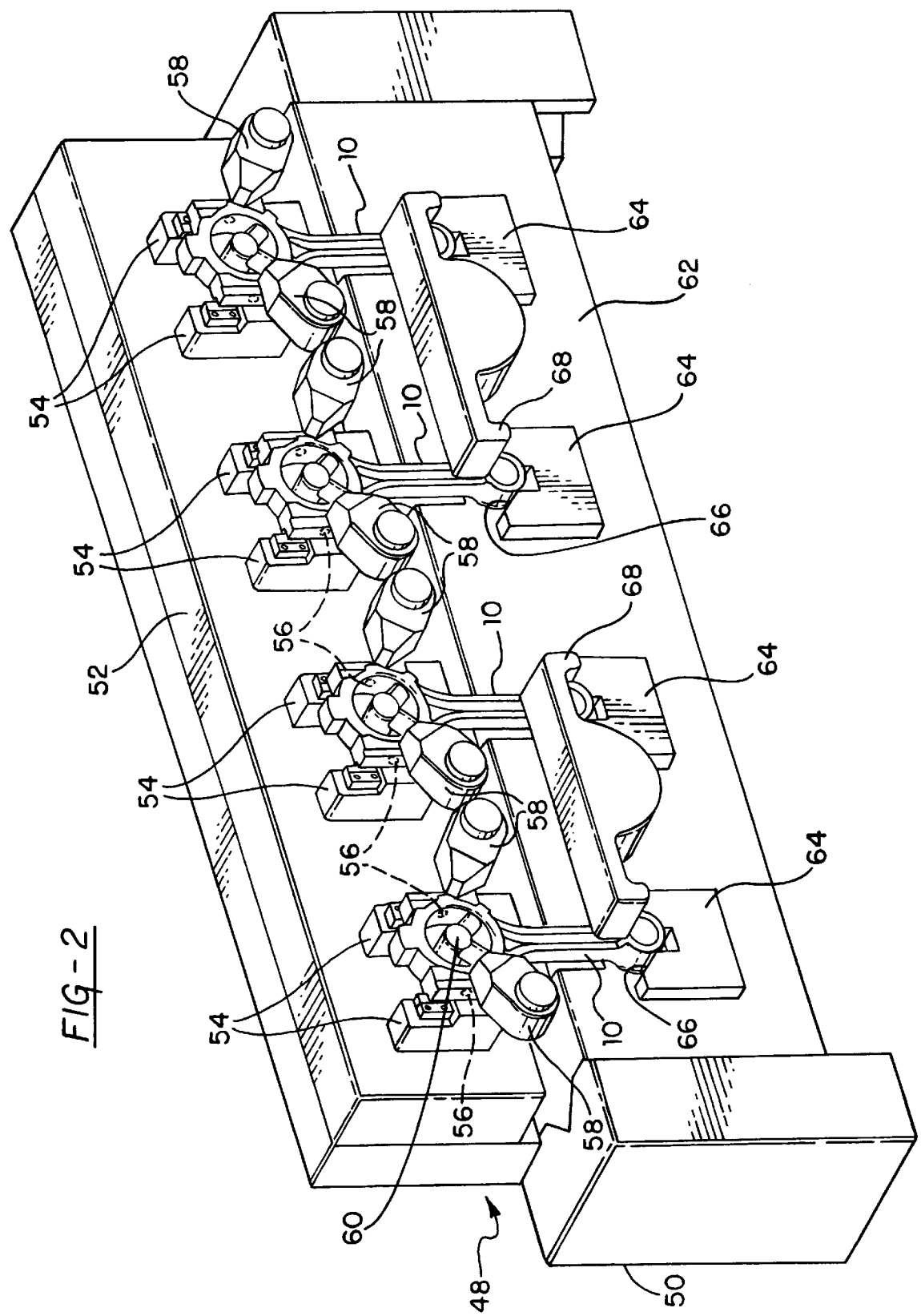
FIG. 2 is a pictorial view of one form of universal connecting rod fixture according to the invention providing for the machining of four identical connecting rods at the same time.

FIG. 2 illustrates one possible embodiment of a universal connecting rod fixture 48 according to the invention. The fixture 48 is designed to accommodate four separate connecting rods 10 for machining. Fixture 48 includes a base 50 which supports a fixed upper body 52 having four spaced pairs of mounting bosses 54. Bosses 54 include spaced locating pads 56 against which the locating points 28 of the connecting rod are positioned. Clamps 58 are provided which are moveable laterally of the connecting rod axes to release or engage the connecting rods at their clamping points 30. An equalizing locator 60 is shown extending into each of the crank bores and including integral legs having ends a fixed distance apart to engage locating points on the crank bore inner diameter. As previously mentioned, the crank bore locating points are spaced equally on opposite sides of the connecting rods longitudinal axes, not shown in FIG. 2. Generally, the legs are positioned to engage these contact points at angles of from 30 to 70 degrees around the crank bore on either side of the axis. However it is noted that the actual contact points are a fixed distance apart so that the angle of contact will vary depending upon the diameter of the crank bore of the particular rod being machined.

In a lower portion of the base 50, the fixture 48 includes a moveable slide 62 on which are mounted four spaced V block locators 64, each having angled walls 66 against which the outer surfaces of the connecting rod pin ends are engaged. Also carried on slide 62 are a pair of clamp members 68, each including two contact points, not shown, which engage the clamping points 36 of the associated connecting rods. The clamp members 68 are moveable laterally of the connecting rod axes to engage or release the ends of the connecting rods.

In operation, the clamps 58, 68 are moved forward in the release position and the equalizing locators 60 are retracted so that a group of four connecting rods 10 may be brought in on a transfer bar, not shown, and dropped into positions engaging the angled walls 66 of the V locator 64. The equalizing locators 60 are then inserted into the crank bores and moved downward to engage the locating points in the crank bores and center the large ends of the connecting rods from side to side. The clamps 58, 68 are then actuated to clamp the connecting rods in position against their respective locating pads 56 and a corresponding pad, not shown opposite the clamps 68. The connecting rods are then positioned so that appropriate tooling may be actuated to drill the connecting rod bolt holes through the ears or flanges 24 provided on the large ends of the connecting rods. Thereafter, the connecting rods are removed from the fixture 48 for separation of the bearing caps and finish grinding as previously mentioned. The rods with the caps reassembled are then installed back into a fixture 48 as previously described and, after the clamps 58, 68 are re-engaged, the equalizing locators are retracted so that the crank bores may be machined. The pin bores are able to be machined at the same time. The connecting rods are then removed from the fixture 48 for honing of the bores as previously mentioned.

Fixture 48 is arranged to provide for the machining of multiple connecting rods of the same length at the same time. To adjust the fixture for machining longer or shorter connecting rids, the slide 62 is moved further away or closer to the upper body 52. The adjustment is complete when the spacing between the V block locators 64 and the equalizing locators 60 match the corresponding dimensions of the new length connecting rods. Reasonable variations in the crank bore diameter and thickness of the rods are accommodated by the design of the fixture 48 as previously described.

While the invention has been described by reference to a preferred embodiment, it should be understood that numerous changes could be made within the spirit and scope of the inventive concepts described. Accordingly it is intended that the invention not be limited to the disclosed embodiment, but that it have the full scope permitted by the language of the following claims.

I claim:

1. A locating fixture for holding various sizes of similar engine connecting rods for machining, the connecting rods having a pin end and a crank end spaced along a longitudinal axis and having opposite sides and a crank bore with predetermined dimensions, said fixture characterized by:

a V locator having angled sides engagable with an outside surface of the pin end for centering said pin end on the axis;

an equalizing locator having two spaced contact points engagable with the crank bore at locations toward the pin end and on opposite sides of the axis for centering the crank end on the axis and urging the pin bore against the V locator;

first locating pads engagable with spaced first locating points on a side of the crank end adjacent to the crank bore;

a second locating pad engagable with a second locating point on a side of the pin end;

first clamp means engagable with first clamping points opposite to said first locating points for holding the crank end against said first locating pads; and second clamp means engagable with a second clamping point opposite to said second locating point for holding said pin end against said second locating pad;

said V locator, said second locating pad, and said second clamp means being movable together in an axial direction to position the fixture for machining connecting rods of differing lengths; the two contact points of said equalizing locator automatically accommodating crank bores of slightly varying diameters.

2. A locating fixture as in claim 1 wherein the contact points of said equalizing locator are positioned to contact the crank bore at angular positions of the bore within a range of 30 to 70 degrees from said longitudinal axis.

3. A locating fixture as in claim 1 wherein said equalizing locator, said first locating pads and said first clamp means are mounted on a fixed part of the fixture and said V locator, said second locating pad and second clamp means are mounted on a movable part of the fixture.

4. A locating fixture as in claim 3 wherein said fixed part of the fixture mounts a plural number of sets of equalizing locators, locating pads and first clamp means and said movable part of the fixture mounts an equal number of sets of V locators second locating pads and second clamp means, such that the fixture can locate an equal number of connecting rods for machining at one time.

5. A locating fixture as in claim 4 wherein at least one of a plurality of said equalizing locators, a plurality of said first clamp means and a plurality of said second clamp means is combined in a unitary component.

* * * * *